United States Patent
Kosaka et al.

(10) Patent No.: US 12,100,231 B2
(45) Date of Patent: Sep. 24, 2024

(54) INFORMATION PROCESSING APPARATUS AND NON-TRANSITORY COMPUTER READABLE MEDIUM STORING PROGRAM

(71) Applicant: FUJIFILM BUSINESS INNOVATION CORP., Tokyo (JP)

(72) Inventors: Fumi Kosaka, Kanagawa (JP); Tadao Michimura, Kanagawa (JP); Shigeru Okada, Kanagawa (JP); Masanori Yoshizuka, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 439 days.

(21) Appl. No.: 17/178,705

(22) Filed: Feb. 18, 2021

(65) Prior Publication Data

US 2022/0012481 A1   Jan. 13, 2022

(30) Foreign Application Priority Data

Jul. 10, 2020 (JP) .................................. 2020-119051

(51) Int. Cl.
| | |
|---|---|
| G06V 30/26 | (2022.01) |
| G06F 40/174 | (2020.01) |
| G06T 7/00 | (2017.01) |
| G06T 11/40 | (2006.01) |
| G06V 30/10 | (2022.01) |
| G06V 30/412 | (2022.01) |

(52) U.S. Cl.
CPC ............ G06V 30/26 (2022.01); G06F 40/174 (2020.01); G06T 7/0002 (2013.01); G06V 30/10 (2022.01); G06V 30/412 (2022.01); G06T 11/40 (2013.01); G06T 2207/10008 (2013.01); G06T 2207/30176 (2013.01)

(58) Field of Classification Search
CPC ...... G06V 30/26; G06V 30/10; G06V 30/412; G06F 40/174; G06T 7/0002; G06T 2207/10008; G06T 2207/30176; G06T 11/40
See application file for complete search history.

(56) References Cited

U.S. PATENT DOCUMENTS

2019/0311563 A1* 10/2019 O'Neill .................. G06F 16/93
2021/0209359 A1*  7/2021 Arakawa ............ H04N 1/00244

FOREIGN PATENT DOCUMENTS

| CA | 2 371 970 A1 * | 11/2000 | ............. G06K 11/18 |
|---|---|---|---|
| JP | 2016-053876 A | 4/2016 | |
| JP | 2016-538764 A * | 4/2016 | ............... G06K 9/03 |

OTHER PUBLICATIONS

Jul. 30, 2024 Office Action issued in Japanese Patent Application No. 2020-119051.

* cited by examiner

*Primary Examiner* — Quoc A Tran
(74) *Attorney, Agent, or Firm* — Oliff PLC (57) ABSTRACT

An information processing apparatus includes a processor configured to acquire recognized items obtained by recognizing characters in a first image showing a reading target including one or more first fields in which characters are written and a second field in which a name or a signature is written, if any one of the first fields is inadequate, create a second image having blank fields for the inadequate first field and the second field, if the second field is inadequate, create a second image having a blank field for the second field, and output the created second image.

20 Claims, 11 Drawing Sheets

APPLICATION FORM — 10a

TO XXX

| ADDRESS | 11a |
| NAME | 12b (SIGNATURE — 12a) |

13

| BANK NAME | 11c |
| ACCOUNT TYPE | BRANCH NAME / SAVINGS ACCOUNT |
| ACCOUNT NUMBER | 11d |
| ACCOUNT HOLDER | 11e |

MANAGEMENT NUMBER: A001

311

| READING ITEM | CATEGORY | RECOGNIZED ITEM | READING COORDINATE INFORMATION (UPPER LEFT COORDINATES), (LOWER RIGHT COORDINATES) |
|---|---|---|---|
| ADDRESS | ENTRY | | (a1, b1), (c1, d1) |
| NAME | NAME | | ⋮ |
| SIGNATURE | SIGNATURE | | ⋮ |
| BANK NAME | ENTRY | | ⋮ |
| BRANCH NAME | ENTRY | | ⋮ |
| ACCOUNT NUMBER | ENTRY | | ⋮ |
| ACCOUNT HOLDER | ENTRY | | ⋮ |
| ⋮ | ⋮ | ⋮ | ⋮ |

FIG. 4

APPLICATION FORM

TO XXX

| ADDRESS | 198-6 ABC BOULEVARD, CENTRAL CITY, INDIANA |
| NAME | JOHN SMITH |

*JOHN SMITH*
SIGNATURE

| BANK NAME | FEDERAL BANK | BRANCH NAME | CENTRAL BRANCH |
| ACCOUNT TYPE | SAVINGS ACCOUNT | | |
| ACCOUNT NUMBER | 0 | 1 | 2 | 3 | 4 | 5 |
| ACCOUNT HOLDER | JOHN SMITH |

FIG. 5

MANAGEMENT NUMBER: A001

311

| READING ITEM | CATEGORY | RECOGNIZED ITEM | READING COORDINATE INFORMATION (UPPER LEFT COORDINATES), (LOWER RIGHT COORDINATES) |
|---|---|---|---|
| ADDRESS | ENTRY | 198-6 ABC BOULEVARD, CENTRAL CITY, INDIANA | (a1, b1), (c1, d1) |
| NAME | ENTRY | JOHN SMITH | ⋮ |
| SIGNATURE | SIGNATURE | *JOHN SMITH* | ⋮ |
| BANK NAME | ENTRY | FEDERAL BANK | ⋮ |
| BRANCH NAME | ENTRY | CENTRAL BRANCH | ⋮ |
| ACCOUNT NUMBER | ENTRY | 012345 | ⋮ |
| ACCOUNT HOLDER | ENTRY | JOHN SMITH | ⋮ |

FIG. 6

APPLICATION FORM

TO XXX

| ADDRESS | |
|---|---|
| NAME | SIGNATURE |

| BANK NAME | FEDERAL BANK | BRANCH NAME | CENTRAL BRANCH |
|---|---|---|---|
| ACCOUNT TYPE | SAVINGS ACCOUNT | | |
| ACCOUNT NUMBER | 0 | 1 | 2 | 3 | 4 | 5 |
| ACCOUNT HOLDER | JOHN SMITH | | |

APPLICATION FORM

TO XXX

| ADDRESS | 196 ABC BOULEVARD, CENTRAL CITY, INDIANA |
| --- | --- |
| NAME | JOHN SMITH |

*JOHN SMITH* —SIGNATURE—

| BANK NAME | FEDERAL BANK | BRANCH NAME | CENTRAL BRANCH |
| --- | --- | --- | --- |
| ACCOUNT TYPE | SAVINGS ACCOUNT | | |
| ACCOUNT NUMBER | 0 1 2 3 4 5 | | |
| ACCOUNT HOLDER | JOHN SMITH | | |

PLEASE FILL IN THE HIGHLIGHTED FIELDS
AND WRITE YOUR NAME AND SIGNATURE
TO SUBMIT THE FORM AGAIN.

APPLICATION FORM

TO XXX

| ADDRESS | |
|---|---|
| NAME | SIGNATURE |

| BANK NAME | | BRANCH NAME | |
|---|---|---|---|
| ACCOUNT TYPE | SAVINGS ACCOUNT | | |
| ACCOUNT NUMBER | | | |
| ACCOUNT HOLDER | | | |

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2020-119051 filed Jul. 10, 2020.

BACKGROUND

(i) Technical Field

The present disclosure relates to an information processing apparatus and a non-transitory computer readable medium storing a program.

(ii) Related Art

In recent years, there is a proposal for a form processing apparatus that, if information written in any field on a form does not satisfy a condition preset in the field, creates a rewriting form having a rewriting field (see, for example, Japanese Unexamined Patent Application Publication No. 2016-53876).

The form processing apparatus described in Japanese Unexamined Patent Application Publication No. 2016-53876 includes a first recognizer, a generator, and a second recognizer. The first recognizer recognizes information written in fields on a form from a form image obtained by reading the form. In the form, form data is printed and information is written in the fields. If a recognition result obtained by the first recognizer does not satisfy a condition preset in any field, the generator generates rewriting form data including a rewriting field and additional information for identifying a rewriting form, and causes a printer to print the rewriting form data. In response to detection of the additional information from a form image obtained by optically reading the printed rewriting form on which information is written in the rewriting field, the second recognizer recognizes the written information from the form image.

SUMMARY

Aspects of non-limiting embodiments of the present disclosure relate to the following circumstances. If any inadequacy is found in a submitted form that requires a name and a signature, a resubmitted form needs to be stored in association with the original form.

Aspects of non-limiting embodiments of the present disclosure therefore relate to an information processing apparatus and a non-transitory computer readable medium storing a program in which, if any inadequacy is found in a reading target, a resubmission image is output as a substitute for the inadequate reading target while keeping the original.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus comprising a processor configured to acquire recognized items obtained by recognizing characters in a first image showing a reading target including one or more first fields in which characters are written and a second field in which a name or a signature is written, if any one of the first fields is inadequate, create a second image having blank fields for the inadequate first field and the second field, if the second field is inadequate, create a second image having a blank field for the second field, and output the created second image.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure are described below with reference to the drawings. In the drawings, components having substantially the same functions are represented by the same reference symbols to omit redundant description thereof.

SUMMARY OF EXEMPLARY EMBODIMENTS

An information processing apparatus according to the exemplary embodiments includes a processor configured to acquire recognized items obtained by recognizing characters in a first image showing a reading target including one or more first fields in which characters are written and a second field in which a name or a signature is written, if any one of the first fields is inadequate, create a second image having blank fields for the inadequate first field and the second field, if the second field is inadequate, create a second image having a blank field for the second field, and output the created second image.

The "reading target" is an object including characters to be read, which is a paper or electronic document including handwritten characters. Examples of the reading target include forms such as an application form, an invoice, and a delivery card, a contract document, and a specification sheet. Regarding the "first image of reading target", the first image is an image obtained by reading a paper document, or is an electronic document itself.

The "inadequacy" is incorrectness of any written item or a signature. The inadequacy includes a formal inadequacy and a substantive inadequacy. Examples of the formal inadequacy include a case where information is not properly written in the field (e.g., a five-digit or smaller-digit account number is written in a field where a six-digit account number is correct, a selection mark (circle or check mark) is missing, a signature is missing, or a majority of a signature is written out of a signature field). Examples of the substantive inadequacy include a case where an address or other written information is incorrect, a case where a recognition rate is low (e.g., the recognition rate is low (e.g., 90% or less) because characters are faint, cursive, or partially out of a field), and a case where a signature is not detectable because the signature is faint. The formal inadequacy and the substantive inadequacy need not be discriminated strictly.

The "recognition" of characters is conversion of handwritten or typed character patterns in a reading target image into character codes conforming to Japanese Industrial Standards (JIS) or the like. Examples of recognition methods include such a method that a recognition target character pattern is converted into a vector, a standard pattern corresponding to a character code is converted into a vector, and the character is successfully recognized when an index represented by a distance (e.g., Euclidean distance) or a similarity (e.g., cosine similarity) between the vectors is equal to or smaller than a threshold. The character recognition may be achieved by using deep learning or other learning models trained by machine learning.

First Exemplary Embodiment

Figure 1:
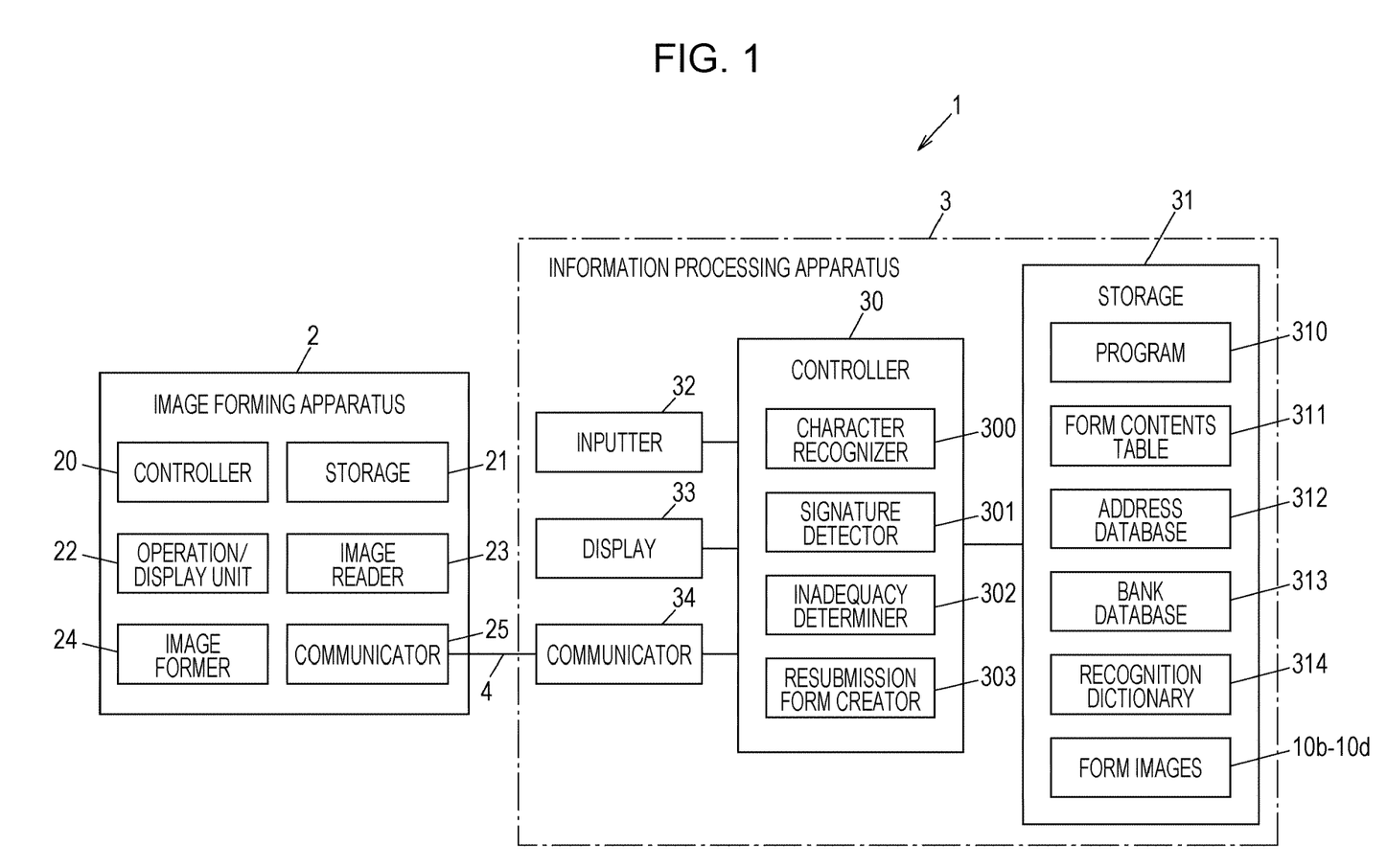
FIG. 1 is a block diagram illustrating an example of the overall configuration of an information processing system according to a first exemplary embodiment of the present disclosure.

FIG. 1 is a block diagram illustrating an example of the overall configuration of an information processing system according to a first exemplary embodiment of the present disclosure.

An information processing system 1 includes an image forming apparatus 2 that reads an image from a form (hereinafter referred to as "form image"), and an information processing apparatus 3 that recognizes characters in the read form image. FIG. 1 illustrates one image forming apparatus 2 and one information processing apparatus 3, but the number of image forming apparatuses 2 and/or the number of information processing apparatuses 3 may be plural in consideration of throughput. The form is an example of the reading target.

The image forming apparatus 2 and the information processing apparatus 3 are connected via a network 4. Examples of the network 4 include a local area network (LAN), a wide area network (WAN), an intranet, and the Internet. The network 4 may be a wired or wireless network.

For example, the image forming apparatus 2 and the information processing apparatus 3 are installed at a service counter or a reception desk of a bank, a city hall, or an insurance company to be accessed by users, and are operated by a person who provides services (hereinafter referred to as "operator"). The image forming apparatus 2 and the information processing apparatus 3 need not be installed at the places described above but may be installed at a factory, an office, or any other business place. The image forming apparatus 2 and the information processing apparatus 3 may be installed at remote places. The following description is directed to an example in which the image forming apparatus 2 and the information processing apparatus 3 are installed at a service counter of a bank.

(Configuration of Image Forming Apparatus)

The image forming apparatus 2 is a multifunction peripheral having, for example, a scanning function, a printing function, a copying function, an email function, and a facsimile function. The image forming apparatus 2 may have only the scanning function and the printing function.

The image forming apparatus 2 includes a controller 20, a storage 21, an operation/display unit 22, an image reader 23, an image former 24, and a communicator 25.

The controller 20 includes an interface and a processor such as a central processing unit (CPU). The controller 20 implements individual functions by executing programs stored in the storage 21.

The storage 21 includes a read only memory (ROM), a random access memory (RAM), and a hard disk drive to store information such as programs and form images.

The operation/display unit 22 is used for inputting and displaying information. Examples of the operation/display unit 22 include a touch panel display having a touch panel laid over a liquid crystal display or other displays.

The image reader 23 includes an automatic document feeder provided on a document platen, and a scanner that optically reads a document image from a document placed on the document platen or fed by the automatic document feeder.

The image former 24 creates a printed material by forming an image on paper fed from a paper feed cassette by using, for example, an electrophotographic or inkjet system.

The communicator 25 communicates with the information processing apparatus 3 via the network 4.

(Configuration of Information Processing Apparatus)

The information processing apparatus 3 includes a controller 30 that controls individual parts of the information processing apparatus 3. A storage 31, an inputter 32 implemented by, for example, a keyboard and a mouse, a display 33 implemented by, for example, a liquid crystal display, and a communicator 34 that communicates with an external apparatus such as the image forming apparatus 2 via the network 4 are connected to the controller 30.

The controller 30 includes an interface and a processor such as a central processing unit (CPU). The controller 30 functions as a character recognizer 300, a signature detector 301, an inadequacy determiner 302, and a resubmission form creator 303 by executing a program 310 stored in the storage 31. The functions 300 to 303 are described later.

Figure 6:
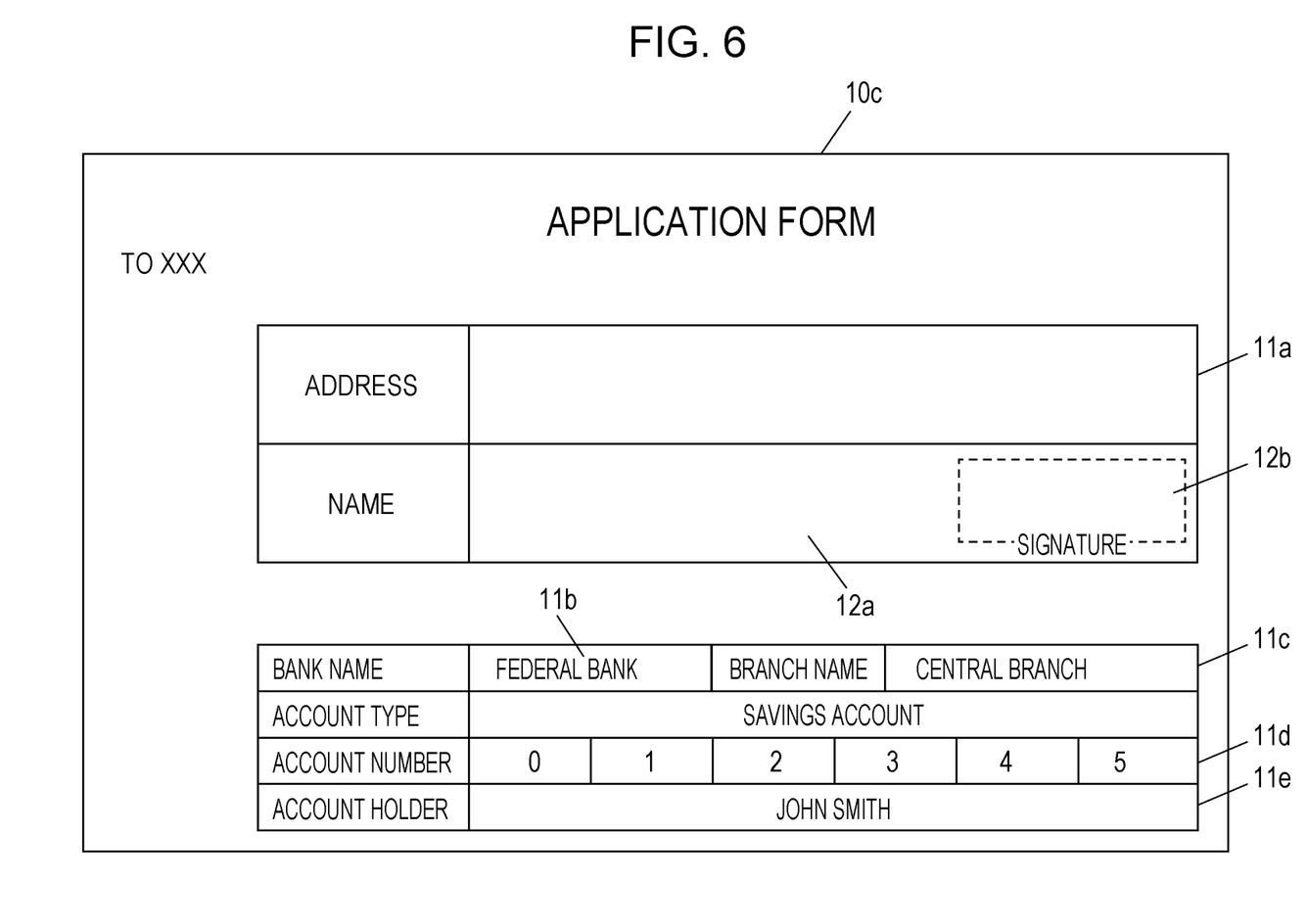
FIG. 6 illustrates an example of a resubmission form image.

The storage 31 includes a read only memory (ROM), a random access memory (RAM), and a hard disk drive to store various types of information such as the program 310, a form contents table 311 (see FIG. 3), an address database 312, a bank database 313, a recognition dictionary 314, a form image 10b (see FIG. 4), and resubmission form images 10c and 10d (see FIG. 6). The form image 10b is an example of the first image. The resubmission form image 10c is an example of the second image. The resubmission form image 10d obtained by writing information and a signature in the resubmission form image 10c is an example of a third image.

Addresses are registered in the address database 312. The inadequacy determiner 302 determines that an address is properly written when the address is written in a format of, for example, "198-6 ABC Boulevard, Central City, Indiana".

Bank names and branch names are registered in the bank database 313.

The recognition dictionary 314 stores standard patterns corresponding to character codes conforming to, for example, Japanese Industrial Standards (JIS).

Figure 2:
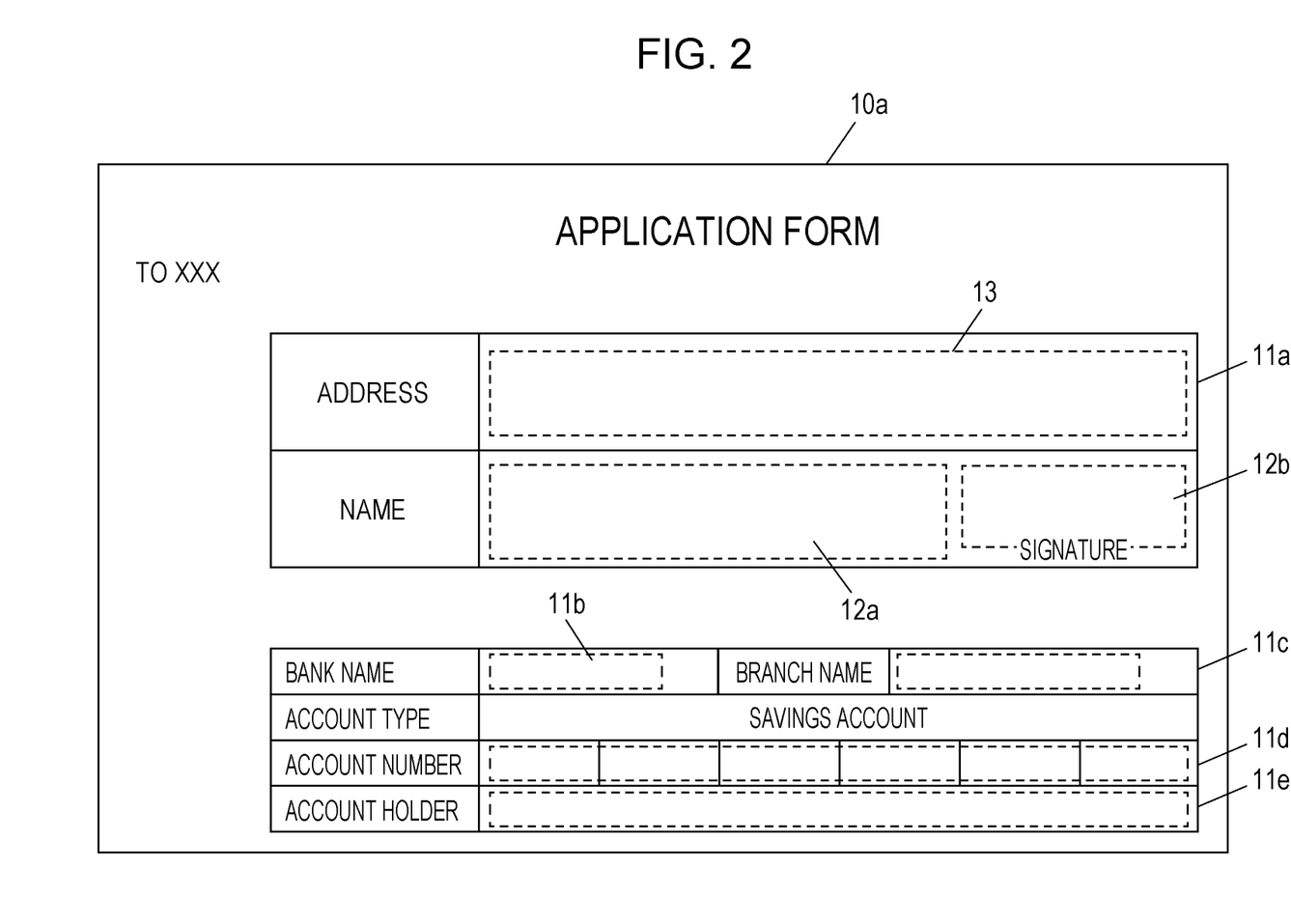
FIG. 2 illustrates an example of a form.

FIG. 2 illustrates an example of a form. A form 10a illustrated in FIG. 2 is printed on paper and has an address field 11a, a bank name field 11b, a branch name field 11c, an account number field 11d, and an account holder field 11e (hereinafter referred to as "first fields 11") in which information is written by a user, and a name field 12a and a signature field 12b (hereinafter referred to as "second fields 12") in which a user's name and a user's signature are written by the user. Each broken line in FIG. 2 indicates a preset rectangular reading area 13 that is not actually printed in the form 10a. The reading area 13 is an area where written character patterns are converted into character codes.

Figure 3:
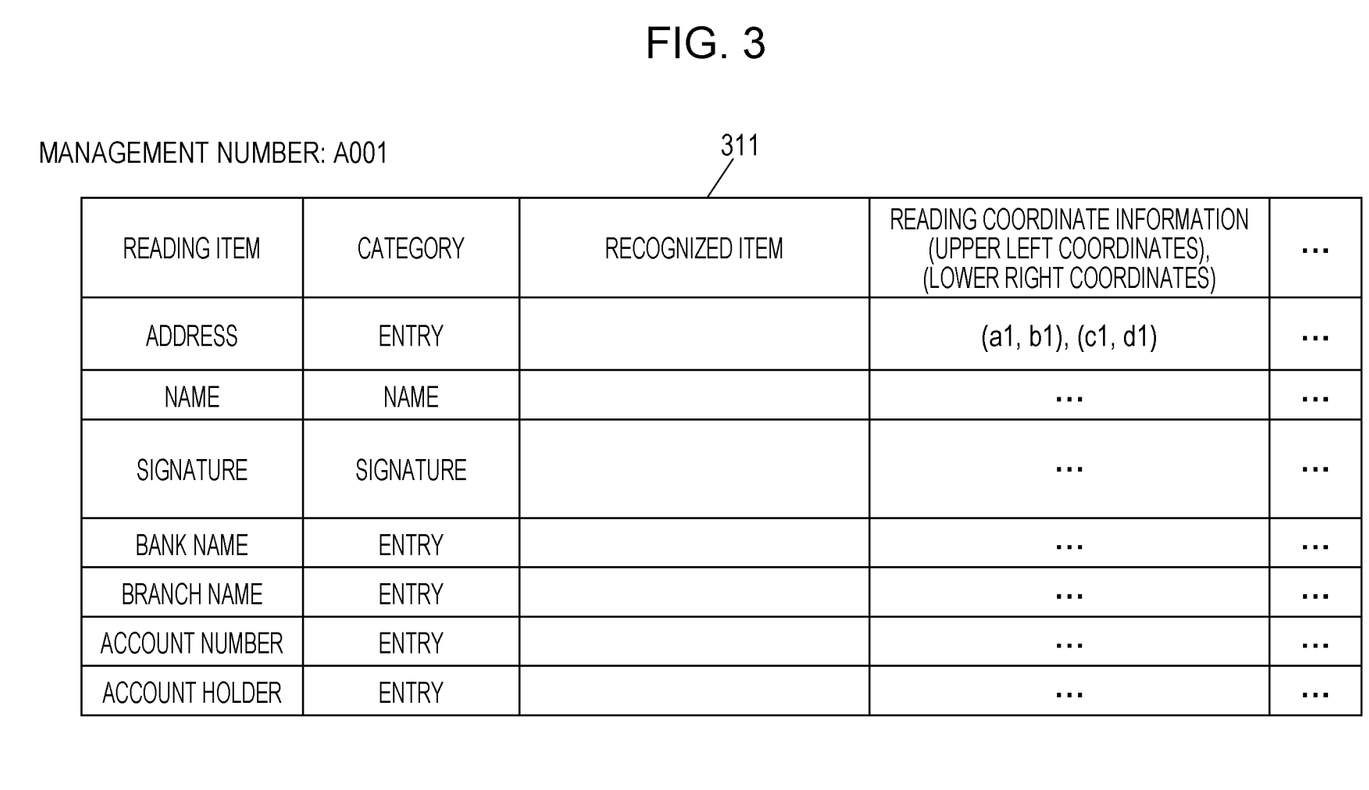
FIG. 3 illustrates an example of a form contents table.

FIG. 3 illustrates an example of the form contents table 311. The form contents table 311 is stored in the storage 31 and has management numbers ("A001" in FIG. 3) assigned to users. The form contents table 311 has a plurality of fields for "reading item", "category", "recognized item", and "reading coordinate information". Among those form contents, the reading item, the category, and the reading coordinate information are preset in association with the type of the form.

Names of items in the first fields 11 and the second fields 12 are recorded in the fields for "reading item". Address, name, signature, bank name, branch name, account number, and account holder in the fields for "reading item" correspond to the address field 11a, the name field 12a, the signature field 12b, the bank name field 11b, the branch name field 11c, the account number field 11d, and the account holder field 11e, respectively.

Categories "entry", "name", and "signature" are selectively recorded in the fields for "category". The category "entry" is a category for the address field 11a, the bank name field 11b, the branch name field 11c, the account number field 11d, and the account holder field 11e other than the name field 12a. The category "name" is a category for the name field 12a. The category "signature" is a category for the signature field 12b.

Recognized characters and a detected signature are recorded in the fields for "recognized item". In the case of the category "entry", a character string is recorded as the recognized item. In the case of the category "signature", a signature is recorded as the recognized item.

Coordinate information (upper left coordinates and lower right coordinates) of a rectangular reading area set for each reading item is recorded in the field for "reading coordinate information". In FIG. 3, "a1, b1" represents upper left coordinates (x, y) of the rectangle and "c1, d1" represents lower right coordinates (x, y) of the rectangle.

Next, the functions 300 to 303 of the controller 30 are described.

The character recognizer 300 extracts a reading area 13 from the form image 10b or the resubmission form image 10d by referring to the reading coordinate information in the form contents table 311, recognizes written characters in the reading area 13, and records the recognized item in the field for "recognized item" in the form contents table 311. Examples of the recognition process include such a process that each written character pattern is converted into a vector, a standard pattern corresponding to a character code registered in the recognition dictionary 314 is converted into a vector, and the character code is obtained as the recognized item when an evaluation value represented by a distance or similarity between the vectors is equal to or smaller than a threshold.

The signature detector 301 detects a signature by determining the position of the signature field 12b in the form image 10b or the resubmission form image 10c by referring to the reading coordinate information in the form contents table 311, and records the detected signature in the field for "recognized item" in the form contents table 311.

Regarding characters written in the address field 11a, the inadequacy determiner 302 compares a recognized item and items in the address database 312. If the recognized item is not registered in the address database 312, the inadequacy determiner 302 determines that the address field 11a is inadequate. Regarding characters written in the bank name field 11b or the branch name field 11c, the inadequacy determiner 302 compares a recognized item and items in the bank database 313. If the recognized item is not registered in the bank database 313, the inadequacy determiner 302 determines that the bank name field 11b or the branch name field 11c is inadequate. Regarding a name in the name field 12a, the inadequacy determiner 302 may use a human name dictionary or the like. Regarding the account number field 11d and the account holder field 11e, the inadequacy determiner 302 may use corresponding databases.

If any one of the fields 11a to 11e serving as the first fields 11 is inadequate, the resubmission form creator 303 creates a resubmission form image 10c having blank fields for the inadequate first field 11 and the second fields 12. If any one of the second fields 12 is inadequate, the resubmission form creator 303 creates a resubmission form image 10c having a blank field for the second field 12. The resubmission form creator 303 transmits the created form image 10c to the image forming apparatus 2. The image forming apparatus 2 prints the form image 10c on paper to create a resubmission form. A resubmission form image 10d obtained by reading the resubmission form on which information and a signature are written serves as the reading target.

When creating the resubmission form image 10c, handwritten characters may be kept or a recognized item may be reflected in a first field 11 having no inadequacy.

When creating the blank field for the first field 11 or the second field 12 having the inadequacy, the characters may be erased by filling the reading area 13 with white or with a background color of the form 10a.

(Operations of Information Processing System)

Figure 7:
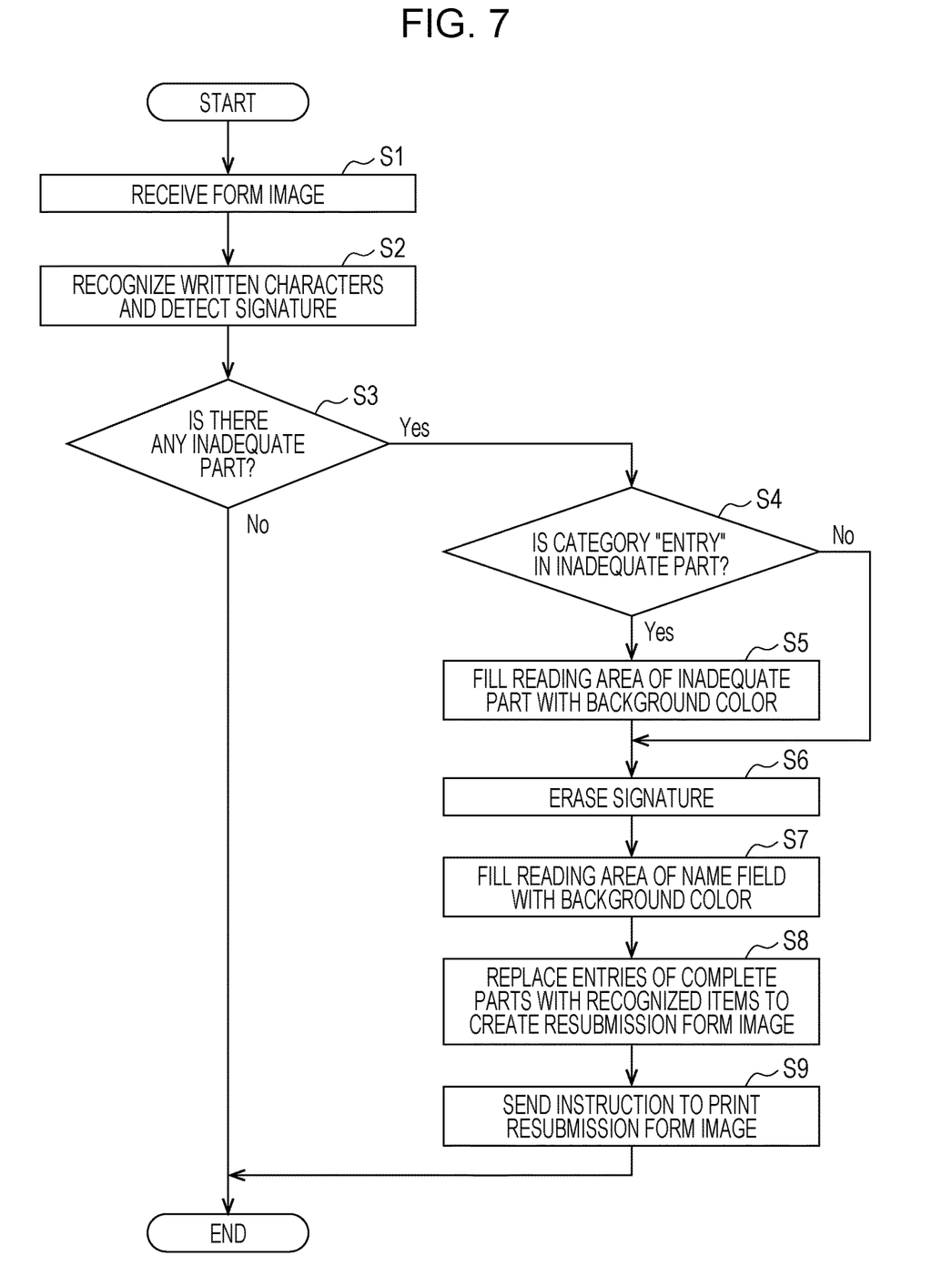
FIG. 7 is a flowchart illustrating an example of operations of an information processing apparatus.

Next, an example of operations of the information processing system 1 is described with reference to FIG. 4 to FIG. 7. FIG. 7 is a flowchart illustrating an example of operations of the information processing apparatus 3.

The operator receives, from a user, a form 10a on which information and a signature are written, and places the form 10a on the document platen of the image reader 23 of the image forming apparatus 2 to read a form image 10b from the form 10a. The image reader 23 causes the scanner to read the form image 10b from the form 10a in a color mode. The controller 20 causes the communicator 25 to transmit the read form image 10b to the information processing apparatus 3 via the network 4. In a case of a plurality of forms 10a, the automatic document feeder may be used.

Figure 4:
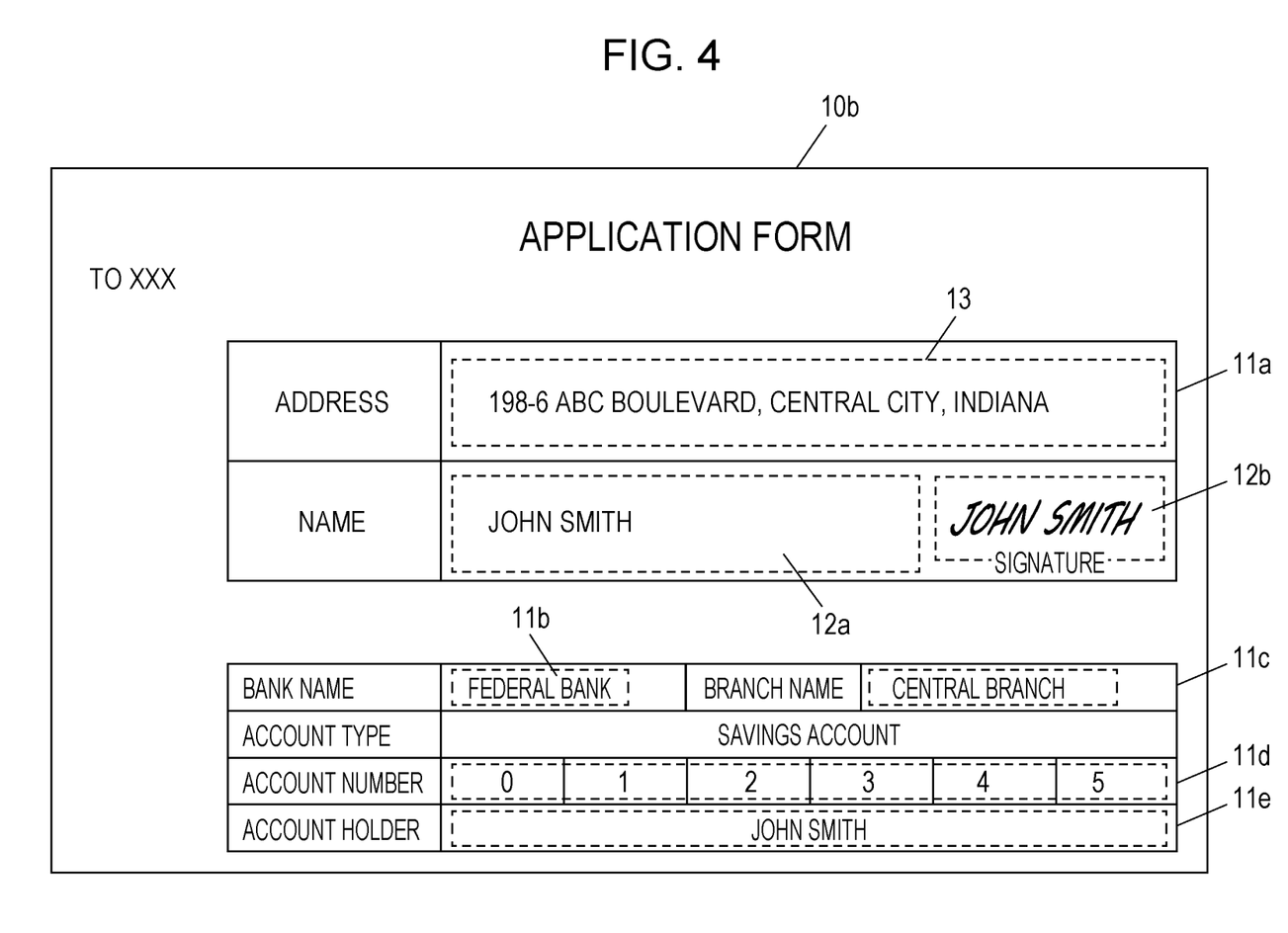
FIG. 4 illustrates an example of a form image.

FIG. 4 illustrates an example of the form image 10b. In the form image 10b, characters are handwritten in the address field 11a, the bank name field 11b, the branch name field 11c, the account number field 11d, the account holder field 11e, and the name field 12a, and a signature is written in the signature field 12b.

The controller 30 of the information processing apparatus 3 causes the communicator 34 to receive the form image 10b from the image forming apparatus 2, and stores the form image 10b in the storage 31 (S1).

The controller 30 recognizes the written characters and detects the signature from the form image 10b (S2).

Figure 5:
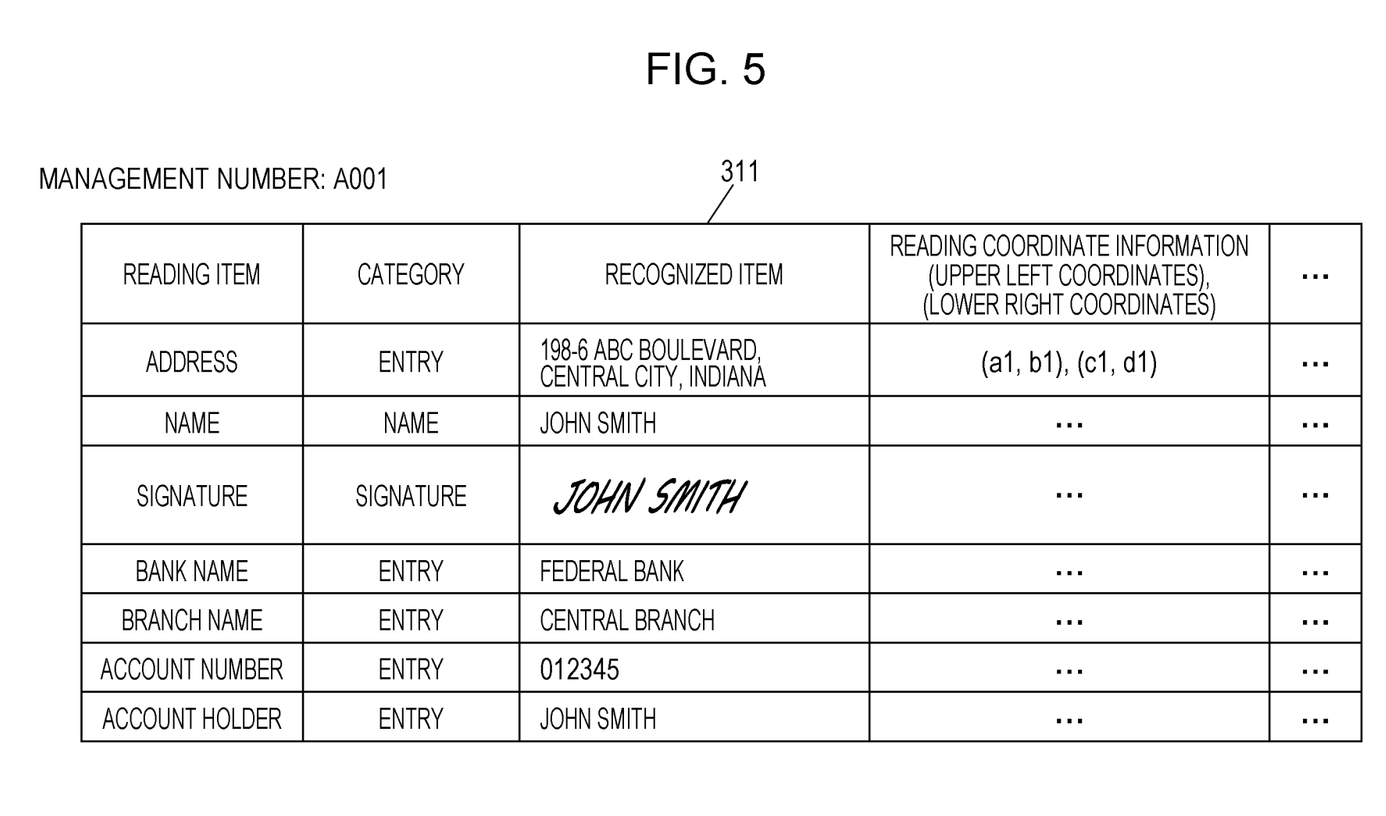
FIG. 5 illustrates an example of a form contents table in which recognized items are recorded.

Specifically, the character recognizer 300 extracts each reading area 13 from the form image 10b by referring to the reading coordinate information in the form contents table 311, recognizes the written characters in the reading area 13, and records the recognized item in the form contents table 311 as illustrated in FIG. 5.

The signature detector 301 detects the signature by determining the position of the signature field 12b in the form image 10b by referring to the reading coordinate information in the form contents table 311, and records the detected signature in the form contents table 311 as illustrated in FIG. 5. When recognizing a name, the signature may be detected first and characters may be recognized by setting a reading area on the left of the position of the detected signature.

The inadequacy determiner 302 determines whether there is any inadequate part (S3). For example, regarding the characters written in the address field 11a, the inadequacy determiner 302 compares a recognized item and the items in the address database 312. If the recognized item is not registered in the address database 312, the inadequacy determiner 302 determines that the address field 11a is inadequate. Regarding the characters written in the bank name field 11b or the branch name field 11c, the inadequacy determiner 302 compares a recognized item and the items in the bank database 313. If the recognized item is not registered in the bank database 313, the inadequacy determiner 302 determines that the bank name field 11b or the branch name field 11c is inadequate.

If the inadequacy determiner 302 determines that there is no inadequate part (S3: No), the process is terminated. If the process is terminated in response to the determination that there is no inadequate part, the controller 30 may delete the form image 10b from the storage 31 though the form image 10b is the original because corresponding data is recorded in the form contents table 311.

If the inadequacy determiner 302 determines that there is an inadequate part (S3: Yes), the resubmission form creator 303 determines whether the category is "entry" in the inadequate part by referring to the form contents table 311 (S4).

If the resubmission form creator 303 determines that the category is "entry" (S4: Yes), the resubmission form creator 303 fills the reading area 13 of the inadequate part with a background color (S5). That is, the characters are erased by filling the written characters in the reading area 13 in the form image 10b with the background color of the form 10a.

The resubmission form creator 303 erases the signature from the form image 10b (S6).

The resubmission form creator 303 fills the reading area 13 of the name field 12a with the background color (S7). That is, the name is erased by filling the written characters in the reading area 13 of the name field 12a in the form image 10b with the background color of the form 10a.

The resubmission form creator 303 replaces entries of complete parts in the form image 10b with typed characters of recognized items recorded in the form contents table 311, thereby converting the form image 10b into a resubmission form image 10c (S8).

The resubmission form creator 303 transmits the resubmission form image 10c to the image forming apparatus 2 and instructs the image forming apparatus 2 to print the resubmission form image 10c (S9).

The image former 24 of the image forming apparatus 2 outputs the resubmission form image 10c by printing the resubmission form image 10c on form paper.

FIG. 6 illustrates an example of the resubmission form image 10c. FIG. 6 illustrates a resubmission form image 10c created when the address field 11a is inadequate. In the resubmission form image 10c, the address field 11a is made blank by being filled with the background color, and the name field 12a is also made blank by being filled with the background color. In the signature field 12b, the signature is erased.

The operator passes, to the user, a resubmission form obtained by printing the resubmission form image 10c. The user receives the resubmission form, writes an address in the blank address field 11a, writes his/her name in the blank name field 12a, writes a signature in the signature field 12b where the previous signature has been erased, and passes the resubmission form to the operator.

The operator receives, from the user, the resubmission form on which the information and the signature are written, and places the resubmission form on the document platen of the image reader 23 of the image forming apparatus 2 to read a resubmission form image 10d from the resubmission form. The image reader 23 causes the scanner to read the resubmission form image 10d from the resubmission form in the color mode. The controller 20 transmits the read resubmission form image 10d to the information processing apparatus 3.

The controller 30 of the information processing apparatus 3 causes the communicator 34 to receive the form image 10d from the image forming apparatus 2, and stores the form image 10d in the storage 31 (S1).

Similarly to the previous form 10a, the controller 30 extracts each reading area 13 from the resubmission form image 10d, recognizes the written characters in the reading area 13, records the recognized item in the form contents table 311, and detects the signature (S2).

Since the typed characters of the recognized items are printed in the complete parts, the characters are recognized at high recognition rates. Therefore, determination is mostly made that there is no inadequate part (S3: No), and the process is terminated.

If the process is terminated in response to the determination that there is no inadequate part, the controller 30 may delete the resubmission form images 10c and 10d from the storage 31 though the resubmission form image 10d is the original because corresponding data is recorded in the form contents table 311. The previously recognized items may be used in the complete parts, and only the currently written characters may be recognized.

If there is an inadequate part (S3: Yes), the processes of Steps S4 to S9 are performed as described above.

Second Exemplary Embodiment

Figure 8:
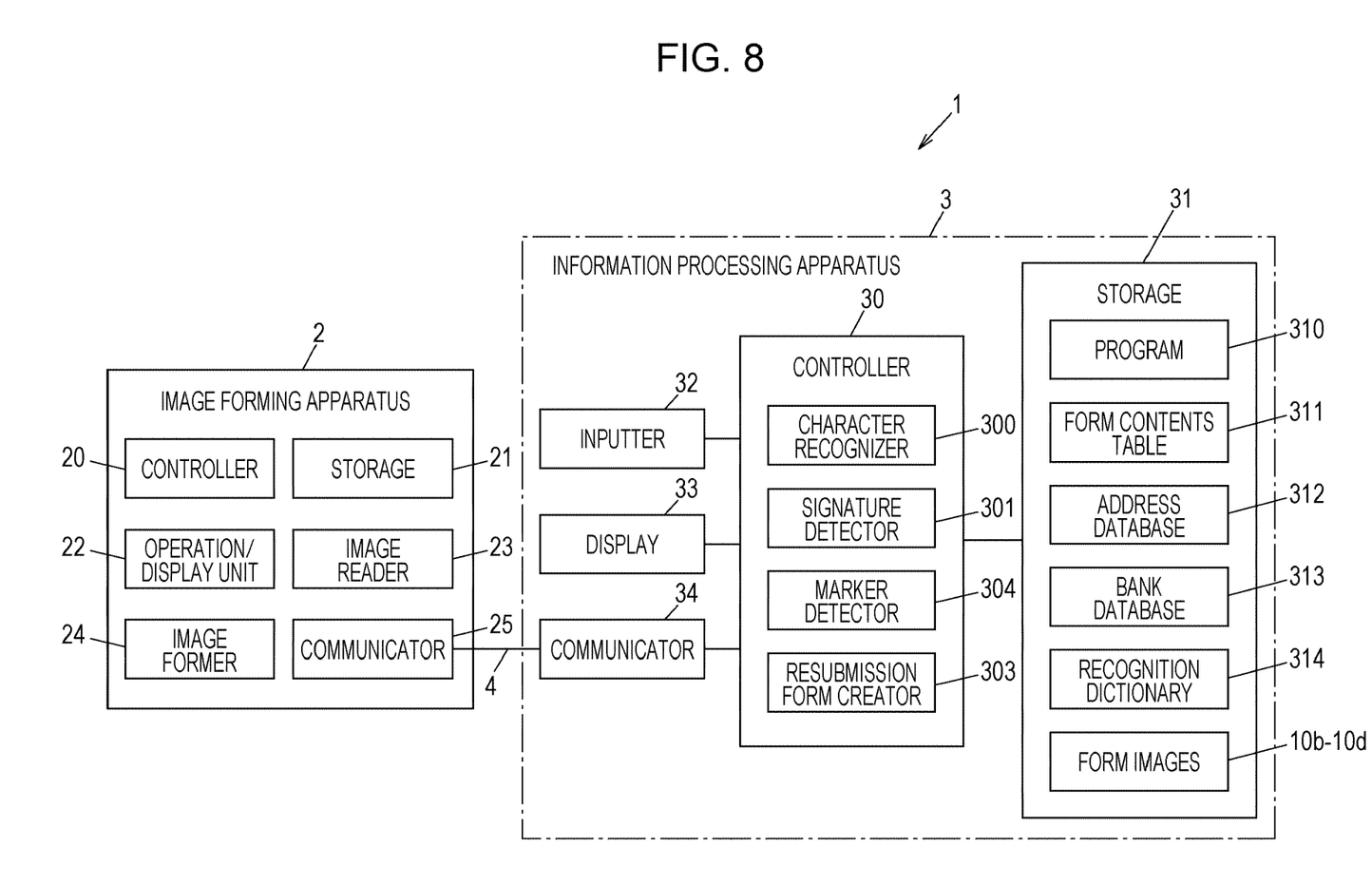
FIG. 8 is a block diagram illustrating an example of the overall configuration of an information processing system according to a second exemplary embodiment of the present disclosure.

FIG. 8 is a block diagram illustrating an example of the overall configuration of an information processing system according to a second exemplary embodiment of the present disclosure. In the first exemplary embodiment, the inadequacy determiner 302 determines whether there is any inadequate part. In the second exemplary embodiment, the inadequacy determiner 302 is not used and a marker detector 304 detects an inadequate part. Description is made below focusing on the difference from the first exemplary embodiment.

Similarly to the first exemplary embodiment, an information processing apparatus 3 includes a controller 30, a storage 31, an inputter 32, a display 33, and a communicator 34.

The controller 30 includes an interface and a processor such as a central processing unit (CPU). The controller 30 functions as a character recognizer 300, a signature detector 301, a resubmission form creator 303, and the marker detector 304 by executing a program 310 stored in the storage 31. The controller 30 does not function as the inadequacy determiner 302.

Similarly to the first exemplary embodiment, the storage 31 stores various types of information such as the program 310, a form contents table 311 (see FIG. 3), an address database 312, a bank database 313, a recognition dictionary 314, a form image 10b (see FIG. 4), and resubmission form images 10c and 10d (see FIG. 6).

Figure 9:
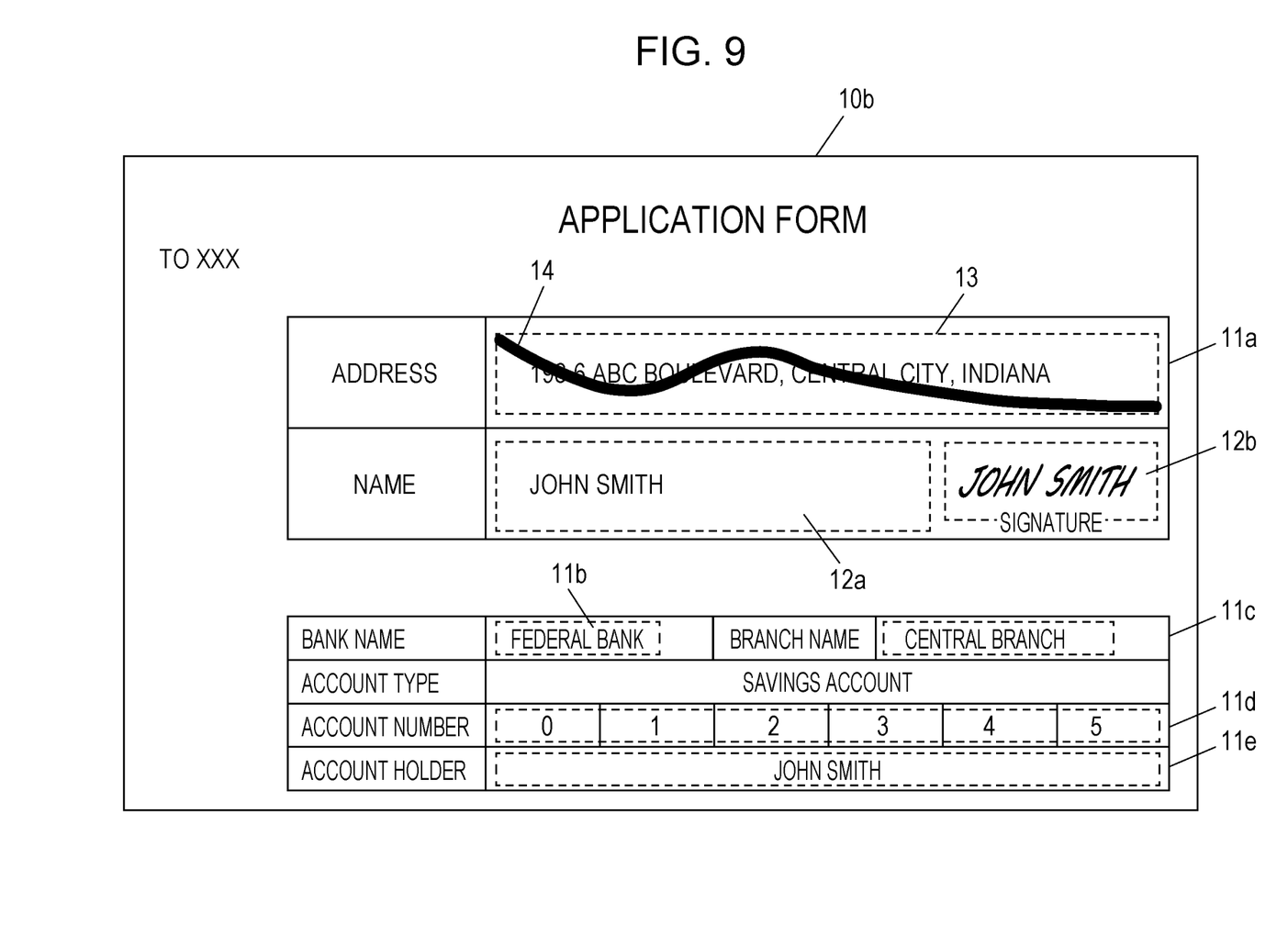
FIG. 9 illustrates an example of a form image including a marker.

The marker detector 304 detects a marker 14 by extracting a part having a specific color from the form image 10b. The color of the marker 14 may be set by operating the inputter 32. The color of the marker 14 may be a specific color (e.g., green or blue) other than a writing color (e.g., black). In this exemplary embodiment, the marker 14 has a line shape but may have other shapes such as a closed shape typified by a circle or a rectangle.

The resubmission form creator 303 sets a rectangular area circumscribing the marker 14 as a reading area 13, and creates a blank field by filling the reading area 13 with a background color. That is, reading coordinate information in the form contents table 311 is not used for the part having the marker 14, but the rectangular area circumscribing the marker 14 is set as the reading area 13. A wider area covering the marker 14 without circumscribing the marker 14 may be set as the reading area 13.

(Operations of Information Processing System)

Figure 10:
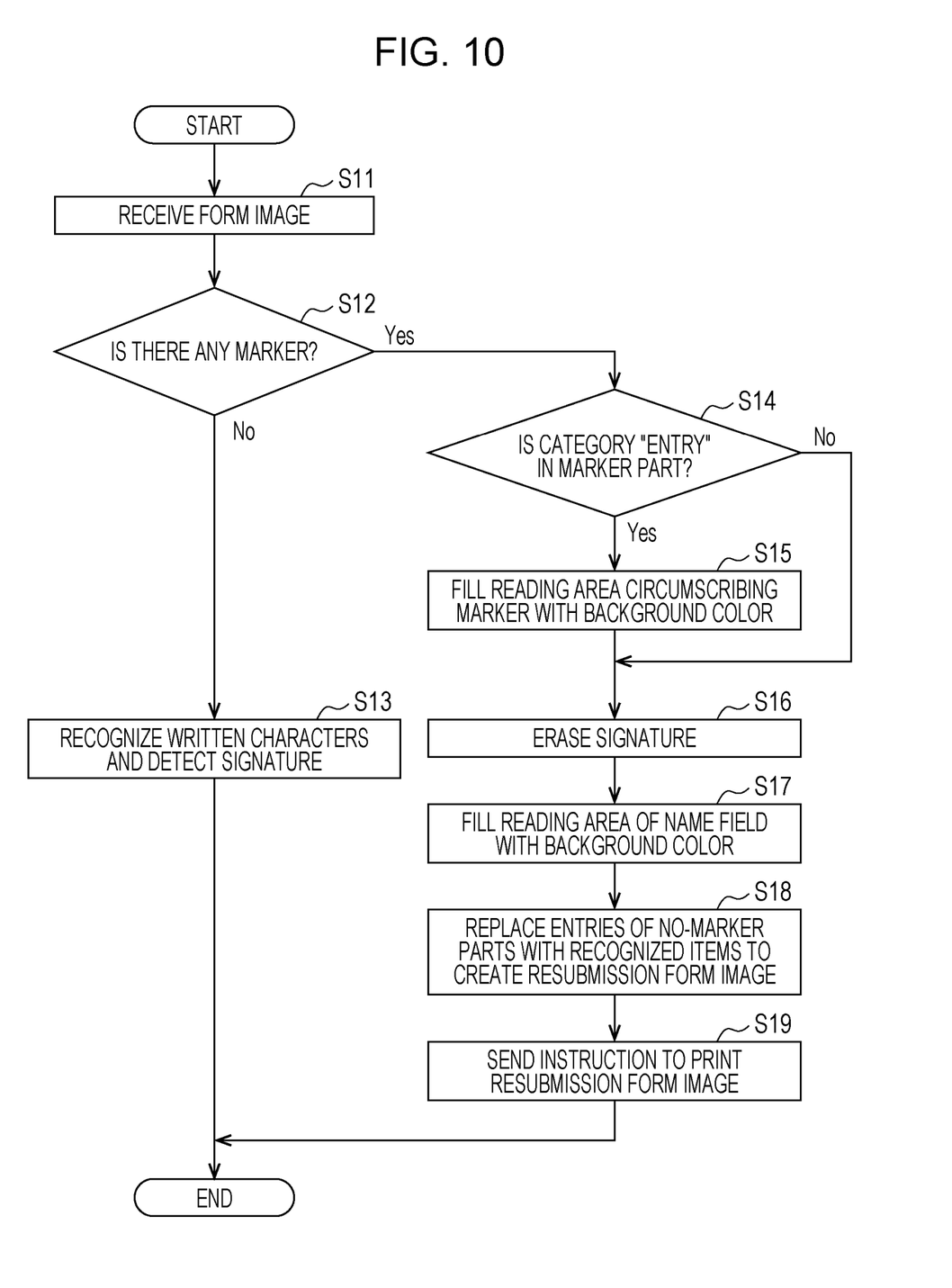
FIG. 10 is a flowchart illustrating an example of operations of an information processing apparatus.

Next, an example of operations of the information processing system 1 is described with reference to FIG. 9 and FIG. 10. FIG. 10 is a flowchart illustrating an example of operations of the information processing apparatus 3.

The operator receives, from a user, a form 10a on which information and a signature are written, and determines whether there is any inadequate part. If any inadequate part is found, the operator puts a marker 14 on the inadequate part, and places the form 10a on a document platen of an image reader 23 of an image forming apparatus 2 to read a form image 10b from the form 10a. The image reader 23 causes a scanner to read the form image 10b from the form 10a in a color mode. A controller 20 causes a communicator 25 to transmit the read form image 10b to the information processing apparatus 3 via a network 4. In a case of a plurality of forms 10a, an automatic document feeder may be used.

FIG. 9 illustrates an example of the form image 10b. In the form image 10b, characters are handwritten in an address field 11a, a bank name field 11b, a branch name field 11c, an account number field 11d, an account holder field 11e, and a name field 12a. Further, a signature is written in a signature field 12b. Further, the marker 14 is put in the address field 11a because an address is incorrect. If the operator suspects that, for example, an address, a bank name, or a branch name may be incorrect, the operator may search the address database 312 or the bank database 313 by inputting the characters written in the form using the inputter 32 to determine whether the input characters have a match.

The controller 30 of the information processing apparatus 3 causes the communicator 34 to receive the form image 10b from the image forming apparatus 2, and stores the form image 10b in the storage 31 (S11).

The marker detector 304 determines whether there is any marker 14 having the specific color (S12). That is, the marker 14 is detected when a part having the specific color is extracted from the form image 10b.

If the marker 14 is not detected (S12: No), similarly to the first exemplary embodiment, the controller 30 recognizes the written characters and detects the signature from the form image 10b, records the recognized item and the detected signature in the form contents table 311 (S13), and terminates the process. If the process is terminated in response to the determination that there is no part having the marker 14, the controller 30 may delete the form image 10b from the storage 31 though the form image 10b is the original because corresponding data is recorded in the form contents table 311.

If the marker 14 is detected (S12: Yes), the controller 30 determines whether the category is "entry" in the part having the marker 14 by referring to the form contents table 311 (S14).

If the controller 30 determines that the category is "entry" (S14: Yes), the resubmission form creator 303 sets an area circumscribing the marker 14 as a reading area 13, and fills the reading area 13 with a background color (S15). That is, the characters and the marker 14 are erased by filling the written characters and the marker 14 in the reading area 13 in the form image 10b with the background color of the form 10a.

The resubmission form creator 303 erases the signature from the form image 10b (S16).

The resubmission form creator 303 fills the reading area 13 of the name field 12a with the background color (S17). That is, the name is erased by filling the written characters in the reading area 13 of the name field 12a in the form image 10b with the background color of the form 10a.

The resubmission form creator 303 replaces entries of complete parts with typed characters of recognized items recorded in the form contents table 311, thereby converting the form image 10b into a resubmission form image 10c (S18).

The controller 30 transmits the resubmission form image 10c to the image forming apparatus 2 and instructs the image forming apparatus 2 to print the resubmission form image 10c (S19).

An image former 24 of the image forming apparatus 2 outputs the resubmission form image 10c illustrated in FIG. 6 by printing the resubmission form image 10c on form paper.

The operator passes, to the user, a resubmission form obtained by printing the resubmission form image 10c. The user receives the resubmission form, writes an address in the blank address field 11a, writes his/her name in the blank name field 12a, writes a signature in the signature field 12b where the previous signature has been erased, and passes the resubmission form to the operator.

The operator receives, from the user, the resubmission form on which the information and the signature are written, and places the resubmission form on the document platen of the image reader 23 of the image forming apparatus 2 to read a resubmission form image 10d from the resubmission form. The image reader 23 causes the scanner to read the resubmission form image 10d from the resubmission form in the color mode. The controller 20 transmits the read resubmission form image 10d to the information processing apparatus 3.

The controller 30 of the information processing apparatus 3 causes the communicator 34 to receive the form image 10d from the image forming apparatus 2, and stores the form image 10d in the storage 31 (S11).

The controller 30 determines whether there is any marker (S12). If the marker 14 is not detected (S12: No), similarly to the previous form 10a, the controller 30 extracts each reading area 13 from the resubmission form image 10d, recognizes the written characters in the reading area 13, records the recognized item in the form contents table 311, and detects the signature (S13). Since the typed characters of the recognized items are printed in the parts having no marker 14, the characters are recognized at high recognition rates. Therefore, determination is mostly made that there is no inadequate part, that is, there is no marker 14 (S12: No).

If the process is terminated in response to the determination that there is no marker 14, the controller 30 may delete the resubmission form images 10*c* and 10*d* from the storage 31 similarly to the first exemplary embodiment.

If the marker 14 is detected (S12: Yes), the processes of Steps S14 to S19 are performed as described above.

Modified Example 1

Figure 11:
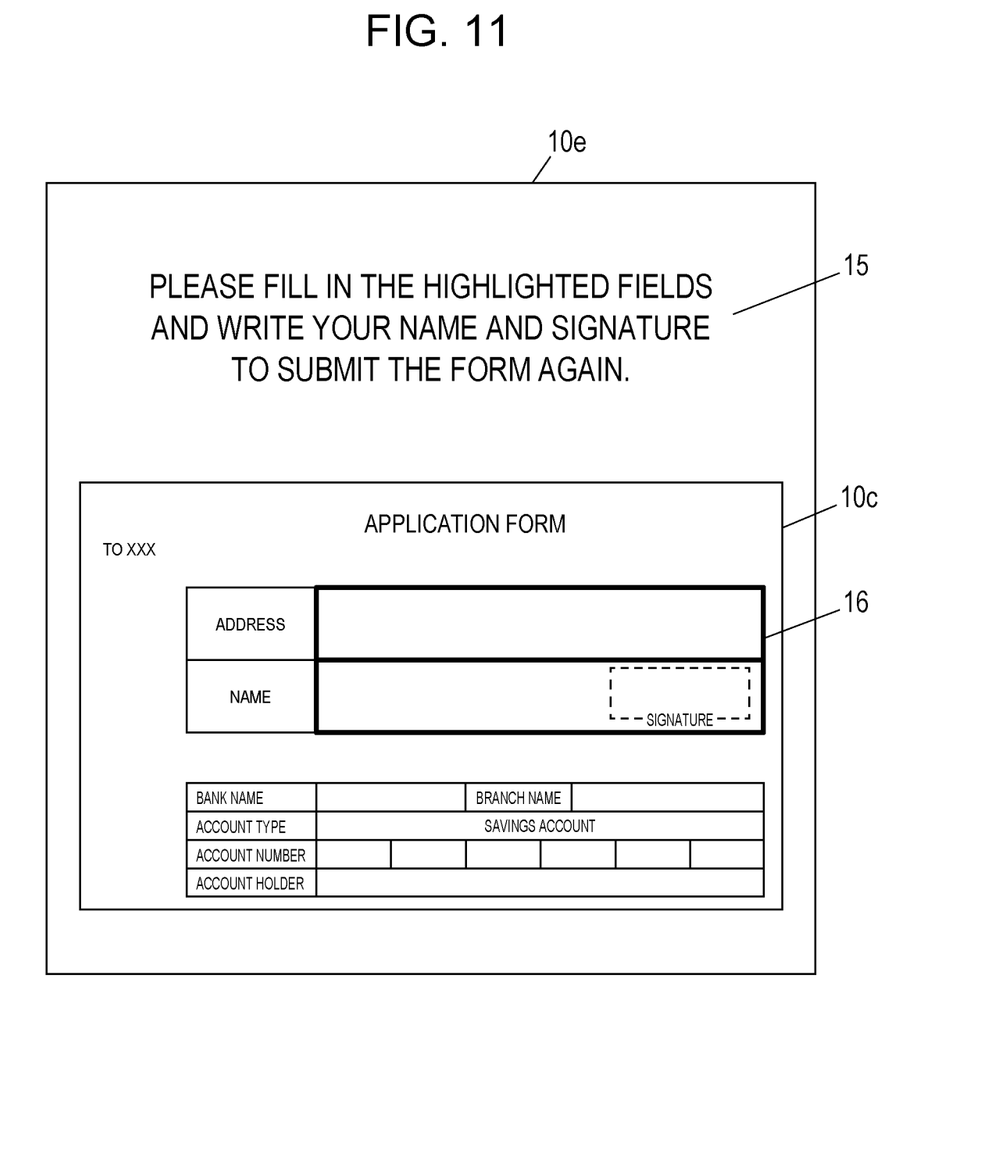
FIG. 11 illustrates an example of an annexed sheet according to Modified Example 1.

When creating the resubmission form image 10*c*, the resubmission form creator 303 also creates an annexed sheet showing an inadequate part, and causes the image forming apparatus 2 to output the annexed sheet.

FIG. 11 illustrates an example of the annexed sheet. An annexed sheet 10*e* includes a message 15 and the resubmission form image 10*c*. In the resubmission form image 10*c*, the inadequate part (address field 11*a* in FIG. 11) is indicated by a box using a red highlight line 16. The highlight line 16 may be a line different from the line enclosing a complete field. Examples of the highlight line 16 include a double line and a line thicker than the lines enclosing the other fields. The highlight line 16 is an example of a format that discriminates an inadequate field from a complete field. The inadequate field may be indicated by putting a mark such as an arrow without highlighting the field. The annexed sheet 10*e* is an example of another image.

Modified Example 2

The controller 30 may transmit and receive the form images 10*b* to 10*d* online between a user terminal and the information processing apparatus 3. In this case, the controller 30 may request an identification document. The controller 30 receives the form image 10*b* or the resubmission form image 10*d* from the user terminal via the network 4, and stores the received form image in the storage 31.

Examples of the identification document include a driver's license, an insurance policy, and a green card. Those documents are also received online. The annexed sheet 10*e* of Modified Example 1 may be transmitted online.

Modified Example 3

The controller 30 may cause the display 33 to display a form image 10*b* including an inadequate part, and create a resubmission form in response to permission from the operator.

Modified Example 4

In the exemplary embodiments described above, the form has the signature field, but the signature field may be omitted. If any first field 11 is inadequate in this case, the resubmission form is created by creating blank fields for the inadequate first field 11 and the name field 12*a*.

The components of the processor may be implemented partially or entirely by hardware circuits such as a field programmable gate array (FPGA) or an application specific integrated circuit (ASIC).

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The components of the exemplary embodiments described above may partially be omitted or changed. In the flows of the exemplary embodiments, steps may be added, omitted, changed, or transposed. The programs for use in the exemplary embodiments may be provided by being recorded in a computer readable recording medium such as a CD-ROM, or may be available via a network by being stored in an external server such as a cloud server.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising a processor configured to
    acquire recognized items obtained by recognizing characters in a first image showing a reading target including one or more first fields in which characters are written and a second field in which a name or a signature is written,
    if any one of the first fields is inadequate, create a second image having blank fields for the inadequate first and the second field, such that the name or signature in the second field is erased in the second image,
    if the second field is inadequate, create a second image having a blank field for the second field, and
    output the created second image.

2. The information processing apparatus according to claim 1, wherein the processor is configured to print the second image on paper to output the second image.

3. The information processing apparatus according to claim 2, wherein the processor is configured to, when creating the second image, reflect the recognized items in the first fields having no inadequacy.

4. The information processing apparatus according to claim 3, wherein the processor is configured to delete the first image after the second image has been created or output.

5. The information processing apparatus according to claim 4, wherein the processor is configured to recognize characters in an entire third image obtained by rewriting characters or a signature in the second image.

6. The information processing apparatus according to claim 2, wherein the processor is configured to output the second image in a format that discriminates an inadequate field from a complete field.

7. The information processing apparatus according to claim 1, wherein the processor is configured to, when creating the second image, reflect the recognized items in the first fields having no inadequacy.

8. The information processing apparatus according to claim 7, wherein the processor is configured to delete the first image after the second image has been created or output.

9. The information processing apparatus according to claim 8, wherein the processor is configured to recognize characters in an entire third image obtained by rewriting characters or a signature in the second image.

10. The information processing apparatus according to claim 7, wherein the processor is configured to output the second image in a format that discriminates an inadequate field from a complete field.

11. The information processing apparatus according to claim 1, wherein the processor is configured to output the second image in a format that discriminates an inadequate field from a complete field.

12. The information processing apparatus according to claim 11, wherein the format is a box enclosing the inadequate field or the complete field.

13. The information processing apparatus according to claim 11, wherein the processor is configured to, when outputting the second image, also output another image showing an inadequate part.

14. The information processing apparatus according to claim 1, wherein the processor is configured to put a marker to indicate an inadequate field in the first image.

15. The information processing apparatus according to claim 14, wherein the processor is configured to detect a rectangular area circumscribing the marker, and create a blank field in the rectangular area.

16. The information processing apparatus according to claim 1, wherein the first image is transmitted online.

17. The information processing apparatus according to claim 16, wherein the processor is configured to request an identification document to transmit the first image online.

18. The information processing apparatus according to claim 1, wherein the processor is configured to display an inadequate part, and create the second image in response to permission.

19. The information processing apparatus according to claim 1, wherein the processor is configured to create the blank field by filling a preset reading area with a background color.

20. A non-transitory computer readable medium storing a program causing a computer to execute a process comprising:
   acquiring recognized items obtained by recognizing characters in a first image showing a reading target including one or more first fields in which characters are written and a second field in which a name or a signature is written,
   if any one of the first fields is inadequate, creating a second image having blank fields for the inadequate first field and the second field, such that the name or signature in the second field is erased in the second image,
   if the second field is inadequate, creating a second image having a blank field for the second field, and
   outputting the created second image.

* * * * *